United States Patent Office 3,364,116
Patented Jan. 16, 1968

3,364,116
METHOD OF USE OF DESALANINO INSULIN COMPOSITIONS
Miklos Bodanszky, Princeton, N.J., and Josef Fried, Chicago, Ill., assignors, by mesne assignments, to E. R. Squibb & Sons, Inc., New York, N.Y., a corporation of Delaware
No Drawing. Continuation-in-part application Ser. No. 191,293, Apr. 30, 1962. This application Nov. 2, 1964, Ser. No. 408,402
4 Claims. (Cl. 167—75)

This application is a continuation-in-part of application, Ser. No. 191,293, filed April 30, 1962, and now abandoned.

This invention relates to new therapeutic compositions and more particularly to new desalanino insulin compositions and the method of using the same in the treatment of diabetes.

Prior to this invention, the use of insulin in the treatment of diabetes was well known. Unfortunately, however, it was equally well known that many diabetic patients developed antibodies to insulin preparations and eventually required as much as thirty to forty times the common dose of insulin in order to control their hyperglycemia.

It is an object of this invention, therefore, to provide new parenteral therapeutic compositions for the treatment of hyperglycemia.

It is another object of this invention to provide new parenteral therapeutic compositions for the treatment of insulin fast diabetics.

It is still another object of this invention to provide an improved method for treatment of insulin fast diabetics.

These objects are accomplished by use of the new compositions of this invention which essentially comprise a desalanino insulin in a parenterally acceptable composition, especially a desalanino insulin derived from pork or whale. By desalanino insulin is meant an insulin from which has been removed the C-terminal alanine group of the B-chain. Such desalanino insulins can be prepared from the insulin which initially contains a C-terminal alanine group, by the method disclosed by Harris et al. in the Journal of the American Chemical Society, volume 74, pages 2945-6, 1952.

Insulin derived from hogs or whales, particularly sperm and finback whales, have A-chains identical with the A-chain of human insulin. When the terminal alanine group is removed from the B-chain of such animal insulin, the B-chain is identical with the B-chain of human insulin lacking a terminal amino acid group. Consequently, by the method of this invention, a highly potent insulin identical with human insulin lacking the terminal group is obtained. In addition, by forming a complex as described hereinafter, a crystalline material free from carboxypeptidase is obtained.

The desalanino pork or whale insulin of this invention has the following structure:

The abbreviations in Formula I have the meaning as follows:

Gly. _____ Glycine.
Leu. _____ Leucine.
Val. _____ Valine.
Glu. _____ Glutamic acid.
Cy. _____ Cysteine.
Ala. _____ Alanine.
Ser. _____ Serine.
Tyr. _____ Tyrosine.
Asp. _____ Aspartic acid.
Phe. _____ Phenylalanine.
His. _____ Histidine.
Arg. _____ Arginine.
Thr. _____ Threonine.
Pro. _____ Proline.
Lys. _____ Lysine.
Ileu. _____ Isoleucine.

To prepare the desalanino insulins, one or a mixture of the C-terminal alanine containing insulins from pork or whale are treated with the enzyme carboxypeptidase, whereby the C-terminal alanine group is selectively removed. The selective enzymatic hydrolysis is preferably conducted by dissolving the insulin in water at a basic pH and treating the insulin solution with a basic solution of carboxypeptidase. The desalanino insulin is obtained after a sufficient incubation time, such as about 1 to about 24 hours, at a temperature in the range of about 5° to about 37° C. and is recovered from the incubation mixture by adjusting the medium to an acid pH, as by treatment with a dilute mineral acid, such as hydrochloric acid.

Rather than using desalanino pork or whale insulin, per se, various complexes and compositions thereof may be employed in order to lengthen the time of action of the desalanino insulin. Thus, the desalanino insulin can be reacted with a zinc salt, such as zinc chloride, preferably in the presence of a buffering agent, such as an organic acid (e.g., acetic, succinic, and citric acid) and an alkali metal hydroxide, whereby a zinc desalanino insulin is obtained; or with an alkaline protein, such as protamine, histone and globin, whereby protamine, histone and globin desalanino insulin are obtained respectively; or with both. The preparation of such complexes and compositions is well known in the art. In addition any other method known in the art whereby the isoelectric point of the desalanino insulin is raised to that of the pH of blood may be used.

To prepare the parenterally acceptable compositions of this invention the desalanino insulin is dissolved in sterile water at a pH of about 2 to about 4 (preferably about 2.5 to about 3.5). The concentration of desalanino insulin is such that about 40 units to about 500 units of desalanino insulin per ml. of final solution is obtained. Preferably, a preservative, such as phenol or m-cresol, is added to the solution, optimally in a concentration of about 0.05% to about 0.5%. An agent to achieve isoton-

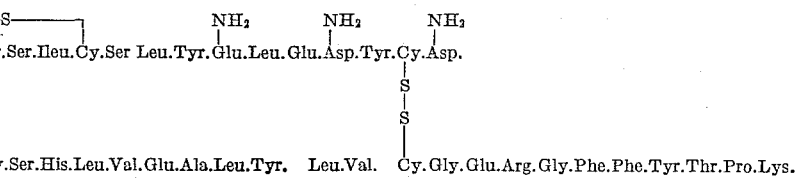

icity, such as glycerin, can also be included, optimally in a concentration of about 0.15%.

In use the compositions of this invention are administered to diabetics subcutaneously in a dose of about 0.25 ml. to about 2 ml. (preferably about 1 ml.), thereby affording a dose of about 20 units to about 1000 units (preferably about 250 units) of desalanino insulin. Although the compositions of this invention may be used in the treatment of all diabetics, they are uniquely advantageous in the treatment of insulin fast diabetics, that is diabetics who have become partially resistant to normal commercially available insulins. Thus, for example, in a patient who required 800 units of pork insulin for maintenance of a normal blood sugar level, it was found that 250 units of desalanino pork insulin would maintain the same sugar level.

The following examples illustrate the invention (all temperatures being in centigrade). The first examples are directed to the preparation of desalanino insulins and the remaining examples to the preparation of the compositions of this invention.

*Example 1.—Desalanino pork insulin*

To a suspension of 20 mg. of diisopropylfluorophosphate-treated carboxypeptidase (Worthington) in 18 ml. of water is added at 0°, 2 ml. of a 1% solution of sodium bicarbonate, followed by sufficient 0.1 N sodium hydroxide to give a solution with a pH of 8. The enzyme solution is then added to a solution of 1.2 g. of crystalline pork zinc-insulin U.S.P., prepared by suspending the insulin in 320 ml. of water and effecting solution by adjusting the pH to 7.8 with 1 N sodium hydroxide. The resulting mixture is incubated at 37° for five hours. The pH is then adjusted to 5.4 with 1 N hydrochloric acid and the resulting precipitate collected in centrifuge tubes and washed with ethanol-ether (1:1) and then with ether. The dried material weighs about 1.1 g. and has a potency of 24 (20-28) units per mg.

*Example 2.—Desalanino whale insulin*

Following the procedure of Example 1, but substituting 1.2 g. of crystalline (sperm) whale zinc-insulin U.S.P. for the pork zinc-insulin, desalanino whale insulin is obtained.

*Example 3.—Crystalline zinc desalanino pork insulin*

250 mg. of desalanino pork insulin, prepared by the procedure of Example 1, is suspended in 12.5 ml. of water and dissolved by adjusting the pH to 2.3 by the addition of 1 N hydrochloric acid. One gram of sodium chloride and some filter aid (Hyflo) are added to the solution. The precipitate which forms is filtered and washed with 8% sodium chloride solution. The precipitate is dissolved in 25 ml. of distilled water and the pH is adjusted to 7.0 with 1 N sodium hydroxide. Acetone is added to a final concentration of 25%. The solution is filtered to remove a small amount of impurities using Hyflo to facilitate filtration. To the filtered solution 1.2 ml. of citrate buffer of pH 5.4 is added (from 5 g. of citric acid in 10 ml. of water and 2.5 g. of sodium hydroxide in 5 ml. of water diluted to 30 ml. with water). Finally 0.25 ml. of 20% zinc chloride solution is added and the pH is adjusted to 6. The walls of the flask are scratched and the mixture is kept at room temperature until a significant part of the modified insulin appears in crystalline form. Several days in the refrigerator (5°) render the crystallization complete. The crystals are then filtered and washed with dilute acetone, finally with acetone and air dried. The crystalline zinc desalanino pork insulin weighs about 117 mg.

*Example 4.—Zinc desalanino whale insulin*

Following the procedure of Example 3, but substituting desalanino whale insulin for the desalanino pork insulin, crystalline zinc desalanino whale insulin is obtained.

*Example 5.—Zinc desalanino pork insulin solution for injection*

To prepare 170 liters of a sterile solution of zinc desalanino pork insulin containing 80 units of insulin per ml. the following procedure is followed:

125 kg. of water for injection is introduced into a batching tank. 2720 g. of glycerin, 170 ml. of redistilled phenol (100%) and 170 ml. of 1 N hydrochloric acid solution are added and the solution is mixed well. 600 g. (13,600,000 units) of zinc desalanino pork insulin is suspended in approximately 9 liters of water for injection. The mixture is stirred and sufficient 1 N hydrochloric acid is added to dissolve the solids and adjust the pH to 2.6 to 2.8. The resulting insulin solution is then added to the batching tank and mixed thoroughly. Sufficient water for injection is added to bring the total solution weight to approximately 165 kg. The pH is adjusted to 2.6 to 2.8 with 1 N hydrochloric acid and sufficient water for injection is added to bring the final solution to 170 liters. The solution is sterilized by filtration under pressure through stainless steel filter paper and filled under sterile conditions into 10 ml. glass vials.

*Example 6.—Zinc desalanino whale insulin solution for injection*

Following the procedure of Example 5, but substituting zinc desalanino whale insulin for the zinc desalanino pork insulin, a zinc desalanino whale insulin solution for injection is obtained.

*Example 7.—Protamine zinc desalanino pork insulin*

To prepare 1000 liters of protamine zinc desalanino pork insulin, assaying 80 units per ml., the following procedure is used:

(a) 450 kg. of water for injection is introduced into a batching tank. 8,000 g. of glycerin, 500 ml. of redistilled phenol (100%) and 500 ml. of 1 N hydrochloric acid solution are added. 850 ml. of zinc chloride solution (200 mg. of zinc per ml.) are then added and the solution is mixed well. 3400 g. of zinc desalanino pork insulin (80,000,000 units) and 1000 g. of protamine sulfate are added and the resulting mixture is stirred. Sufficient 1 N hydrochloric acid is added to bring the pH to 2.9–3.0 and to dissolve the solids. Sufficient water for injection is then added to bring the final solution to 500 liters and the solution is sterilized by filtration under pressure and the protamine zinc desalanino pork insulin is collected in 20 liter bottles for the filling operation.

(b) 500 kg. of water for injection is introduced into a batching tank. 2,200 g. of sodium phosphate dibasic, anhydrous, 8,800 g. of glycerin and 2,200 ml. of redistilled phenol (100%) are added and the resulting solution is mixed. Sufficient water for injection is then added to bring the total solution to 550 liters and the solution is mixed. The pH of the resulting buffer solution is adjusted so that when mixed with an equal volume of the protamine zinc desalanino pork insulin solution, a pH of 2.9–3.0 is obtained. This is done by adding either 1 N hydrochloric acid or 1 N sodium hydroxide. The buffer solution is sterilized by filtration under pressure and collected in 20 liter bottles.

(c) Using appropriate apparatus 10 ml. vials are filled with 5 ml. of the sterile protamine zinc desalanino pork insulin solution.

*Example 8.—NPH desalanino pork insulin*

To prepare 500 liters of NPH desalanino pork insulin, containing 80 units of insulin per ml., the following procedure is followed:

(a) 200 liters of water for injection is introduced into a batching tank, 4,000 g. of glycerin, 375 g. of freshly distilled meta-cresol, 162.5 ml. of redistilled phenol (100%) and 250 ml. of 1 N hydrochloric acid are added and the resulting solution is mixed. 30 ml. of zinc chloride solution (200 mg. of zinc per ml.) are added and the resulting mixture is mixed thoroughly. 1,700 g. of zinc desalanino pork insulin (40,000,000 units) and 168 g. of protamine sulfate are added and the resulting mixture is stirred. Sufficient 1 N hydrochloric acid is added to bring the pH to 2.7 to 3.0 and to dissolve all the solids. Sufficient water for injection is then added to bring the solution to a weight of 245 kg. and the pH is adjusted to 2.7 to 3.0 with 1 N hydrochloric acid. Sufficient water for injection to bring the final solution to 250 liters is then added and the solution is thoroughly mixed. The solution is sterilized by filtration under pressure.

(b) 200 liters of water for injection is introduced into a batching tank. 1,400 g. of sodium phosphate dibasic, anhydrous, 5,600 g. of glycerin, 525 g. of freshly distilled meta-cresol and 227.5 ml. of redistilled phenol (100%) are added and the resulting solution is mixed. Sufficient water for injection to bring the solution to a weight of 250 kg. is added and the solution is mixed. The pH of the buffer solution is adjusted so that when mixed with an equal amount of the solution prepared in step *a*, a pH of 2.7 to 3.0 is attained. 1 N hydrochloric acid or 1 N sodium hydroxide is used for this purpose. The solution is then sterilized by filtration under pressure.

(c) Using the proper apparatus, 10 ml. vials are filled with 5 ml. of the sterile buffer solution obtained in step *b* and 5 ml. of the sterile desalanino pork insulin-protamine-zinc solution obtained in step *a*.

*Example 9.—Long acting zinc desalanino pork insulin preparation*

A solution of 1% zinc desalanino pork insulin, 0.05 M sodium citrate, 470 mcg. of zinc ion (from zinc chloride) per ml., and 7% sodium chloride, having a pH of 6.0–6.1, is prepared. From this solution long acting zinc desalanino pork insulin crystals are obtained by sterile crystallization.

For more prompt response the long acting insulin crystals prepared as described above can be combined with varying combinations of sterile amorphous zinc desalanino pork insulin containing 2 mcg. of zinc per unit. Such combination gives both a prompt response and a prolonged action. The sterile amorphous zinc desalanino pork insulin is prepared by adding to a sterile solution of 1% insulin, 470 mcg. of zinc ion (from zinc chloride) per cc. and adjusting the pH to 7.0 with 1 N sodium hydroxide. The amorphous insulin is precipitated and collected sterily.

The invention may be variously otherwise embodied within the scope of the appended claims.

What is claimed is:

1. A method for treating diabetes, which comprises subcutaneously administering to an insulin fast diabetic about 20 to about 1000 units of a member of the group consisting of desalanino pork insulin, zinc desalanino pork insulin and protamine zinc desalanino pork insulin in a sterile aqueous solution.

2. A method for treating diabetes, which comprises subcutaneously administering to an insulin fast diabetic desalanino pork insulin in a subcutaneously acceptable aqueous composition containing about 40 to about 500 units per ml. of said insulin.

3. A method for treating diabetes, which comprises subcutaneously administering to an insulin fast diabetic, zinc desalanino pork insulin in a parenterally acceptable aqueous composition containing about 40 to about 500 units per ml. of said insulin.

4. A method for treating diabetes, which comprises subcutaneously administering to an insulin fast diabetic zinc protamine desalanino pork insulin in a sterile aqueous solution containing about 40 to about 500 units per ml. of said insulin.

References Cited

Harris et al.: Journal of the American Chemical Society, vol. 74, pages 2945–2946 (1952).

Van Abeele et al.: Federation of American Societies for Experimental Biology, Federation Proceedings, vol. 10, page 263 (1951).

ALBERT T. MEYERS, *Primary Examiner.*

JULIAN S. LEVITT, *Examiner.*

L. B. RANDALL, *Assistant Examiner.*